(12) United States Patent
Geldman

(10) Patent No.: US 9,372,125 B2
(45) Date of Patent: Jun. 21, 2016

(54) LOAD DETECTING DEVICE

(71) Applicant: Vishay Advanced Technologies, Ltd., Holon (IL)

(72) Inventor: Chaim Geldman, Ramat Gan (IL)

(73) Assignee: Vishay Advanced Technologies, Ltd., Holon (IL)

( * ) Notice: Subject to any disclaimer, the term of this patent is extended or adjusted under 35 U.S.C. 154(b) by 262 days.

(21) Appl. No.: 14/243,282

(22) Filed: Apr. 2, 2014

(65) Prior Publication Data

US 2014/0298923 A1    Oct. 9, 2014

(30) Foreign Application Priority Data

Apr. 8, 2013    (EP) .................................... 13162764

(51) Int. Cl.
| | |
|---|---|
| *G01L 1/04* | (2006.01) |
| *G01L 1/22* | (2006.01) |
| *G01G 3/14* | (2006.01) |
| *G01G 19/12* | (2006.01) |

(52) U.S. Cl.
CPC ............ *G01L 1/2287* (2013.01); *G01G 3/1402* (2013.01); *G01G 19/12* (2013.01); *G01L 1/2206* (2013.01)

(58) Field of Classification Search
CPC ....... G01L 1/2231; G01L 1/2287; G01L 1/14; G01L 5/161; G01L 3/10; B60R 2021/01516; G01B 7/18

USPC ...................... 73/862.627, 862.625, 862.044, 73/862.325, 763, 862.381
See application file for complete search history.

(56) References Cited

U.S. PATENT DOCUMENTS

| | | | | |
|---|---|---|---|---|
| 2,666,262 | A * | 1/1954 | Ruge ..................... | G01L 1/2206 177/211 |
| 3,780,817 | A * | 12/1973 | Videon ................ | G01G 3/1406 177/136 |
| 4,102,031 | A * | 7/1978 | Reichow ............. | G01G 3/1406 29/464 |
| 5,495,770 | A * | 3/1996 | Stark, Jr. .................. | G01B 7/16 248/206.5 |
| 6,578,434 | B1 * | 6/2003 | Maubant ................. | G01B 7/16 73/849 |
| 7,357,036 | B2 * | 4/2008 | Steprath ............... | A01B 63/112 73/767 |
| 2003/0010106 | A1 * | 1/2003 | Mattmann ............ | G01L 1/2287 73/146 |

* cited by examiner

*Primary Examiner* — Lisa Caputo
*Assistant Examiner* — Nigel Plumb
(74) *Attorney, Agent, or Firm* — Volpe and Koenig, P.C.

(57) ABSTRACT

A load detecting device for attachment to a structure under load comprises a carrier unit and a plurality of strain gages. The carrier unit comprises a first and a second mounting section arranged along a longitudinal axis and connected by a sensing section, wherein the plurality of strain gages are arranged at the sensing section of the carrier unit. The sensing section includes two connecting elements extending along the longitudinal axis between the first mounting section and the second mounting section, each of the connecting elements being curved and having a convex side, the convex sides of the two connecting elements facing each other.

20 Claims, 4 Drawing Sheets

LOAD DETECTING DEVICE

CROSS REFERENCE TO RELATED APPLICATION

This application claims the benefit of European Patent Application No. 13162764.8 filed Apr. 8, 2013 which is incorporated by reference as if fully set forth.

FIELD OF INVENTION

The present invention relates to a load detecting device for attachment to a structure under load comprising a carrier unit and a plurality of strain gages, wherein the carrier unit comprises a first and a second mounting section arranged along a longitudinal axis and connected by a sensing section, and wherein the plurality of strain gages are arranged at the sensing section of the carrier unit.

BACKGROUND

Load detecting devices, for example transducers or extensometers, are mounted to a structure, for example a rear axle of a mobile crane, to measure a force applied to the structure by converting the force into an electrical output signal. Such load detecting devices can detect when a set of wheels connected to the rear axle of the crane or other support member is at risk of lifting off the ground, causing a hazardous situation.

Prior art load detecting devices typically comprise a carrier unit mounted to the structure and which carrier unit carries a plurality of strain gages (or "gauges"). As the carrier unit is deformed under tensile and compressive forces from a force applied to the structure, an electrical resistance of each strain gage (or "gauge") changes and the changes can be measured, for example, in a full bridge circuit with four active arms. Conventional load detecting devices often suffer from weak output signals and a non-linear relationship between a change in applied force and a change in the output voltage. Such disadvantages reduce the sensitivity and accuracy of the load detection.

SUMMARY

It is the object of the present application to provide an improved load detecting device in which the sensitivity of the load detecting capabilities is increased and which reduces the margin of error for the load detection measurements.

This object is satisfied in accordance with the independent claim. The dependent claims are directed at preferred embodiments of the device in accordance with the invention.

A load detecting device in accordance with the invention comprises a carrier unit and a plurality of strain gages, wherein the carrier unit comprises a first mounting section and a second mounting section arranged along a longitudinal axis and connected by a sensing section, wherein the plurality of strain gages are arranged at the sensing section of the carrier unit, and wherein the sensing section includes two connecting elements extending along the longitudinal axis between the first mounting section and the second mounting section, each of the connecting elements being curved and having a convex side, the convex sides of the two connecting elements facing each other.

Since the sensing section comprises two curved connecting elements, a force applied to the structure causes a bending deformation of each of the connecting elements. Such a bending deformation of the curved connecting elements mechanically amplifies a corresponding deformation of the strain gages carried at the sensing section, more specifically at the connecting elements. The resulting increased output signal results in a greater sensitivity for measuring the force applied to the structure. Such an increased output signal may particularly result when at least one respective strain gage is provided both at the convex side and at the concave side of each curved connecting element, as will be explained below.

Furthermore, the amplified deformation of the connecting beams also result in a more linear relationship between a change in strain resulting from the applied force and a change in the output signal of the strain gages, thus increasing the accuracy of the load detection.

In an advantageous embodiment, the connecting elements each have an at least substantially constant cross section. The substantially constant cross section results in a particularly uniform deflection of the connecting elements when force is applied to the connecting elements.

It is particularly beneficial for each of the connecting elements to have the same cross section. In doing so each of the connecting elements will cause the same or a similar deflection to the deflection of the other connecting element, resulting in redundant output signals and thus a more accurate calculation of the force applied to the structure.

In a further embodiment of the present invention, each of the connecting elements has a flat rectangular cross section defined by a long dimension and a short dimension. The long dimension of the cross section of one of the two connecting elements is oriented in the same direction as the long dimension of the cross section of the other connecting element. In other words, the longitudinal cross sections are not only the same for each connecting element; they are also oriented in the same direction, which also leads to uniform deflection of both connecting elements.

The force applied to the structure results in a maximum deformation of the strain gages when the strain gages carried at the connecting elements are arranged at a central position of each connecting element. That is to say each strain gage is preferably located at a point at the connecting element which is equidistant to the first and second mounting section at which the magnitude of deflection is greatest.

In an advantageous embodiment, all of the strain gages carried at the connecting elements are oriented to be deformed in a direction extending parallel to the longitudinal axis of the carrier unit, i.e. the strain gages are oriented substantially parallel to the longitudinal axis of the carrier unit. A single strain gage or a pair of strain gages may be provided at each location.

Alternatively or additionally, each of the connecting elements advantageously has a concave side opposite to the convex side with each of the connecting elements carrying at least one strain gage at the convex side and at least one strain gage at the concave side. Such an arrangement can result in a high combined output signal of the different strain gages. Particularly, the at least one strain gage at the convex side of each connecting element and the at least one strain gage at the concave side of each connecting element may generate electrical signals of essentially the same magnitude but different signs (corresponding to a tensile force and a compressive force respectively), and these signals may be combined to a single output signal. In one embodiment, each of the two connecting elements carries one strain gage at its convex side and one strain gage at its concave side, with all four strain gages being oriented to be deformed in a direction extending parallel to the longitudinal axis of the carrier unit, as explained above. In this embodiment the total of four strain gages provided at the two connecting elements preferably are electrically connected to form a Wheatstone bridge for obtaining a high sensitivity (so-called full-bridge configuration).

In another embodiment having a particularly high signal amplification, each of the connecting elements has a concave side opposite to the convex side with each of the connecting elements carrying a first pair of strain gages at the convex side and a second pair of strain gages at the concave side. The two pairs of strain gages of each connecting element serve to detect the strain in the connecting element along the longitudinal axis of the carrier unit. The total of four strain gages provided at each connecting element conveniently can be electrically connected to form a Wheatstone bridge for obtaining a high sensitivity (so-called full-bridge configuration).

In this embodiment the two strain gages of the first pair and the two strain gages of the second pair of each connecting element preferably are oriented to be deformed in a direction extending parallel to the longitudinal axis of the carrier unit, as explained above. Specifically, when a load is applied to the carrier unit such that the mounting sections are pulled or pushed in opposite directions from each other along the longitudinal axis, the first pair of strain gages at the convex side of each connecting element for example has a negative output while the second pair of strain gages at the concave side of each connecting element has an output of opposite sign (for example a positive output). The two pairs of strain gages on each connecting element are connected to form a Wheatstone bridge to create two redundant bridges (one Wheatstone bridge at each connecting element).

The load detecting device can be easily mounted to the structure when the first mounting section of the carrier unit comprises a mounting bore extending along a first mounting axis and the second mounting section of the carrier unit comprises a mounting bore extending along a second mounting axis. The first mounting axis and the second mounting axis extend parallel to one another and perpendicular to the longitudinal axis of the carrier unit.

A uniform deformation of all strain gages or pairs of strain gages located at the connecting elements occurs when the connecting elements of the sensing section extend substantially parallel to a plane defined by the first mounting axis and the second mounting axis.

In another embodiment of the invention, each of the connecting elements has a first end connected to the first mounting section of the carrier unit and a second end connected to the second mounting section of the carrier unit, wherein the distance between the first ends of the connecting elements in a direction perpendicular to the longitudinal axis of the carrier unit corresponds to a total width of the first mounting section in said direction, and wherein the distance between the second ends of the connecting elements in said direction corresponds to a total width of the second mounting section in said direction. Thus the connecting elements are attached to each mounting block in a way that their ends are spaced at a maximum distance.

Furthermore, the first mounting section and the second mounting section of the carrier unit each comprise a cuboid block, wherein the first ends of the connecting elements are connected to opposing lateral edges of a side face of the cuboid block forming the first mounting section, and wherein the second ends of the connecting elements are connected to opposing lateral edges of a side face of the cuboid block forming the second mounting section. In other words, the ends of the connecting elements are connected to lateral edges of each cuboid block which may, for example, have rectangular side faces. This arrangement of attachment and shape of the mounting sections allows for a simple and inexpensive manufacture of the carrier unit.

In another embodiment, a straight connecting bar extending along the longitudinal axis of the carrier unit additionally connects the mounting sections of the carrier unit. The connecting bar serves to stabilize the connecting elements and prevent a mechanical overload of the connecting elements due to the force applied to the structure.

The connecting bar preferably has a cross sectional area smaller than the cross sectional area of the connecting elements so that it does not increase a stiffness of the carrier unit and impair the desired deflection of the connecting elements.

In a further aspect of the present invention a cover which covers at least the sensing section of the carrier unit is provided to protect the strain gages and electronics from environmental influences when the load detecting device is mounted to the structure under load.

BRIEF DESCRIPTION OF THE DRAWING

The advantageous features are described in an exemplary manner only and are not intended to restrict the inventive apparatus in any way or form. The invention will be described in the following with regard to further features and advantages by way of examples with reference to embodiments in the enclosed drawings. The Figures of the drawings show.

DETAILED DESCRIPTION

Figure 1:
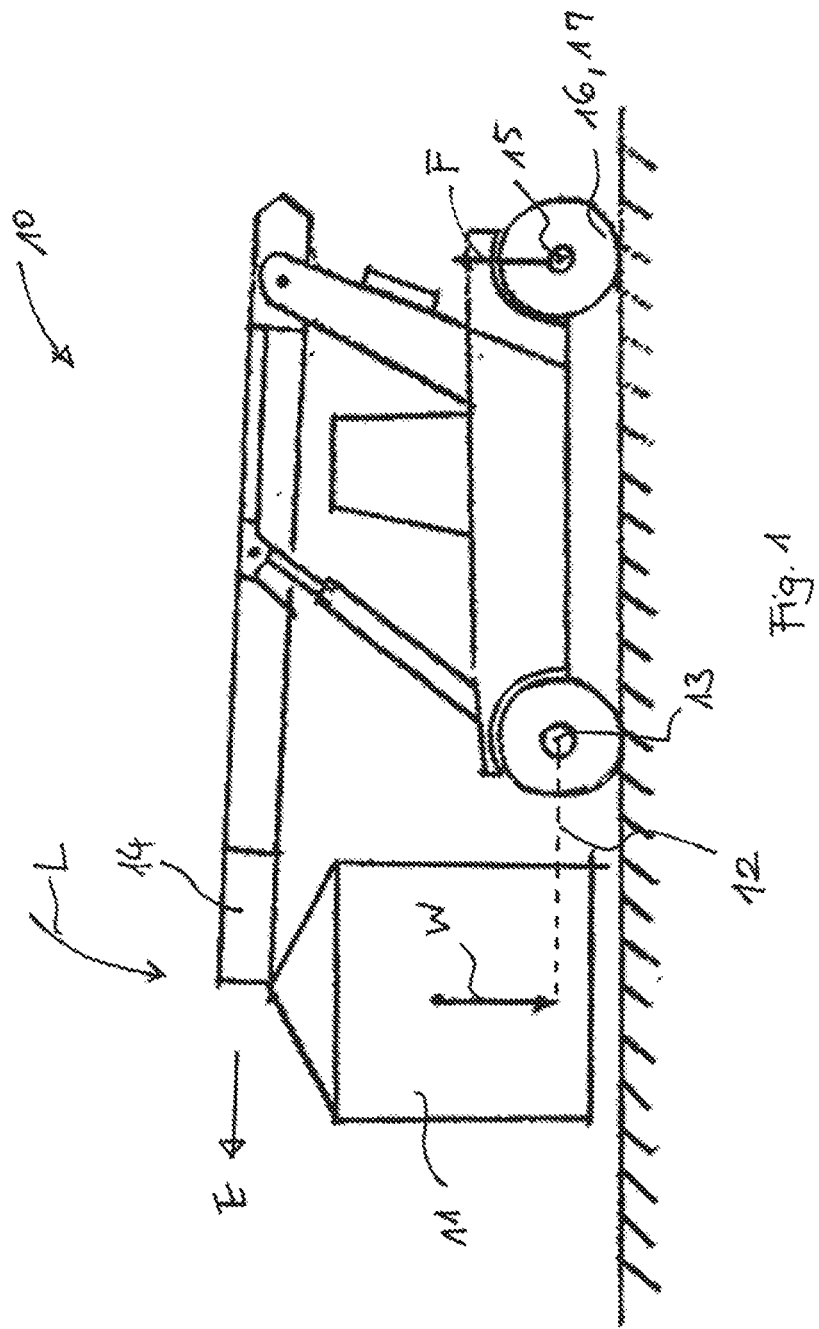
FIG. 1 A side view of a structure under load.

FIG. 1 shows a mobile crane 10 for lifting a load 11. The load 11 has a weight W acting at the center of gravity. A lever arm 12 is defined by the distance between a front axle 13 of the crane 10 and the direction of the gravity force acting upon the weight W (i.e. the vertical axis as seen from the center of gravity of the load 11). The lever arm 12 becomes longer as the crane 10 extends a boom 14 in a direction E. Similarly, the lever arm 12 may become longer as the crane 10 pivotally lowers the load 11 in a lowering direction L. The lengthening of lever arm 12 may lead to an increase in magnitude of a force F acting on a rear axle 15 of the crane 10. When the force F becomes sufficiently large, a pair of rear tires 16, 17 of the rear axle 15 lift dangerously off of the ground in the direction of force F. This poses a particular hazard as the crane 10 is unbalanced and at risk of tipping.

In mobile structures such as crane 10, it is particularly advantageous to prevent tipping without the use of heavy counterweights which may restrict the mobility of crane 10. When the force F acts on the rear axle 15 it causes a detectable strain or change of strain in the rear axle 15. By detecting and monitoring the force F, it is possible for the operator of crane 10 to stop the lifting of the load 11 before the crane 10 begins to actually tip. In this context, a load detecting device in accordance with the invention may be mounted to the rear axle.

Figure 2:
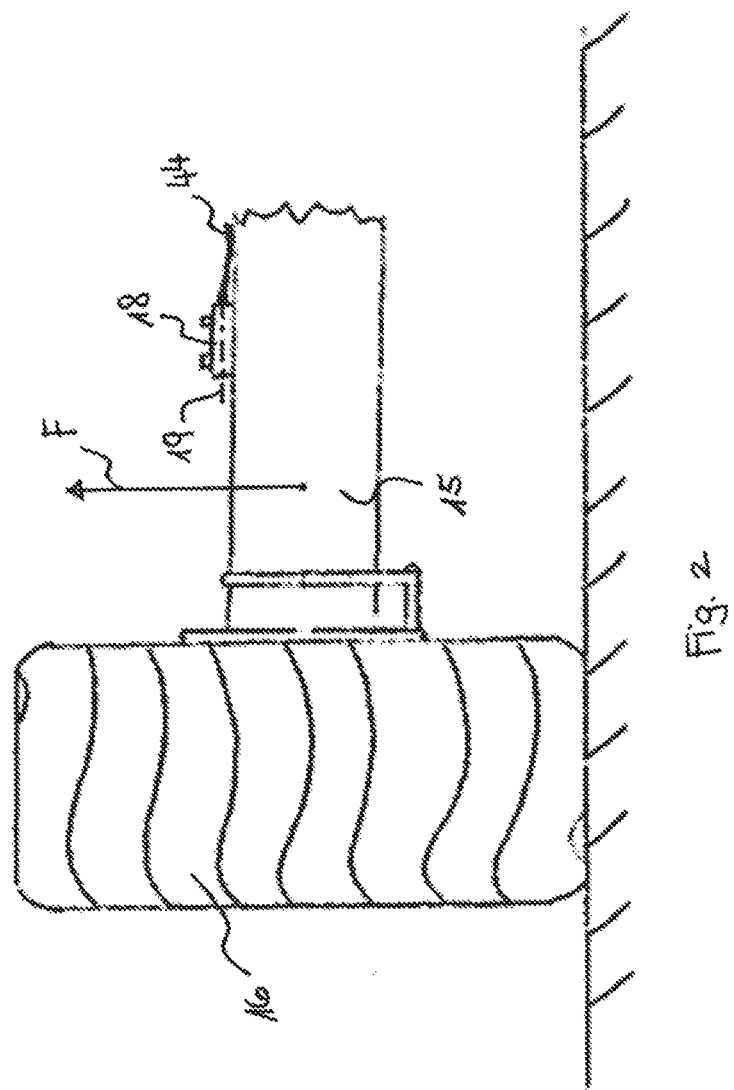
FIG. 2 A partial rear view of a load detecting device in accordance with the invention mounted to the structure under load.

FIG. 2 shows in a schematic illustration a partial view of such a load detecting device 18 in its mounted state, more specifically at a position on the rear axle 15 as far as possible from the rear tire 16. The load detecting device 18 comprises a longitudinal axis 19 extending parallel to the rear axle 15.

Furthermore, the load detecting device 18 communicates via a cable 44 with a control system of crane 10 which is not shown for reasons of clarity.

The load detecting device 18 is fixedly mounted to the rear axle 15; therefore the strain in the rear axle 15 also deforms the load detecting device 18 along the longitudinal axis 19. The size of load detecting device 18 is significantly smaller than the size of the rear axle 15 as shown in FIG. 2 by way of example. Therefore, it poses a challenge for the load detecting device 18, on the one hand, to accurately detect the changes in a length of the rear axle 15 due to the strain from force F. On the other hand, the magnitude of the force F acting on the rear axle 15, the weight W of the load 11 and the weight of the crane 10 itself are large enough to potentially cause the load detecting device 18 to mechanically fail. Therefore, the load detecting device 18 must be designed in a way to reliably measure the strain in the rear axle 15 without mechanically failing.

Figure 3:
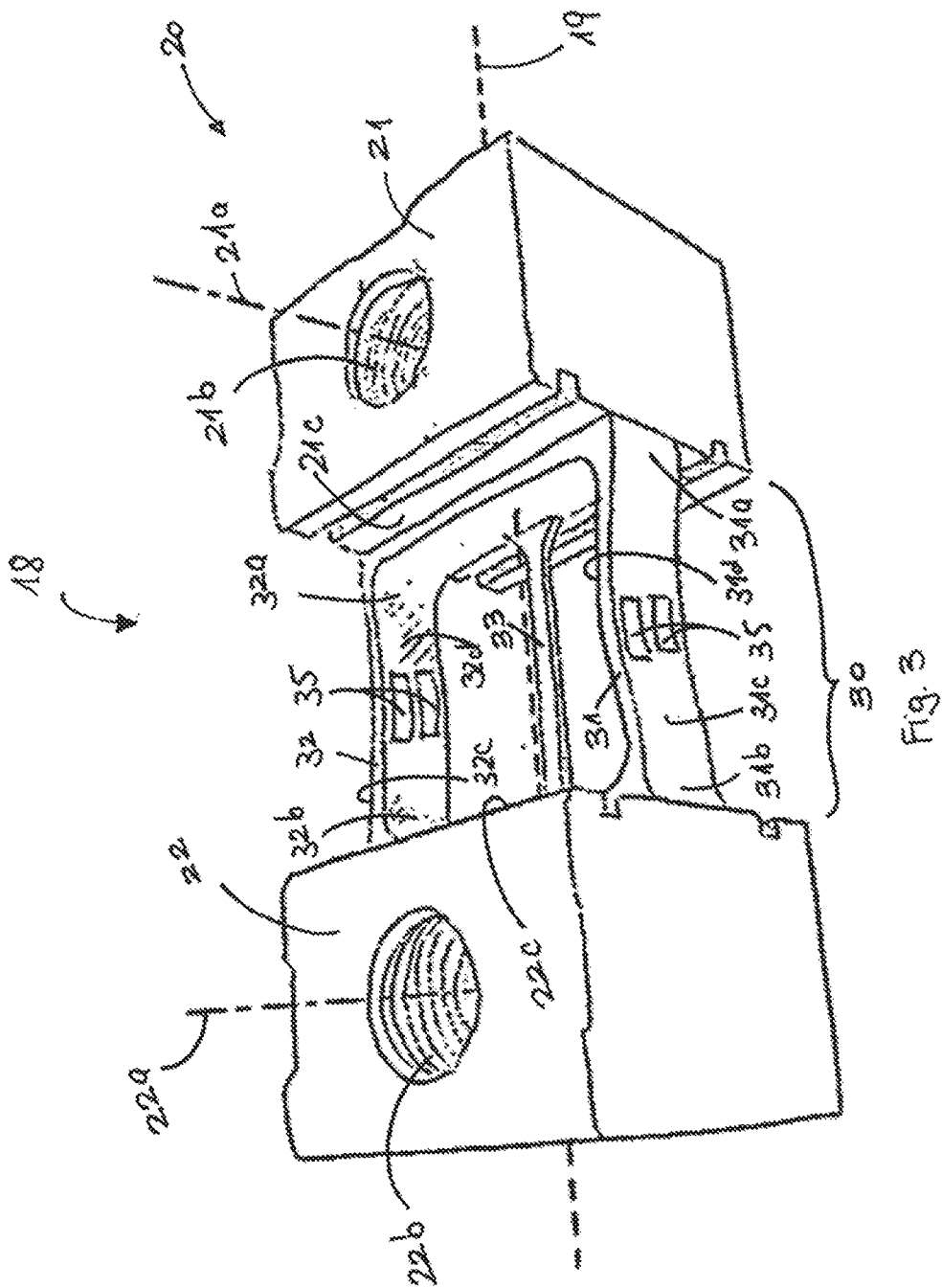
FIG. 3 A perspective view of a carrier unit of the load detecting device in accordance with the invention.

FIG. 3 shows in perspective view parts of the load detecting device 18. The load detecting device 18 comprises a carrier unit 20 made of metal. The carrier unit 20 comprises a first mounting section 21 and a second mounting section 22 which are configured as cuboid blocks arranged coaxially along the longitudinal axis 19. The first mounting section 21 and the second mounting section 22 are connected by a sensing section 30. The first mounting section 21, the second mounting section 22 and the sensing section 30 can be formed as a single part, or the three sections 21, 22, 30 are formed as separate parts fixedly attached to one another.

The first mounting section 21 comprises a mounting bore 21b extending along a mounting axis 21a, wherein the mounting axis 21a extends perpendicular to the longitudinal axis 19. The mounting bore 21a continuously extends through the first mounting block 21 and receives a mounting bolt 41 (see FIG. 4) for attaching the first mounting section 21 to a fixed position at the rear axle 15. Likewise the second mounting section 22 comprises a continuous mounting bore 22b extending along a mounting bore 22a. The mounting axis 22a extends parallel to mounting axis 21a and is perpendicular to the longitudinal axis 19. A second mounting bolt 42 can be received in the mounting bore 22b to fixedly attach the second mounting section 22 to the rear axle 15 (see FIG. 4).

The first mounting section 21 and second mounting section 22 each have a side face 21c, 22c, which are arranged perpendicular to the longitudinal axis 19. The side face 21c of the first mounting section 21 is oriented in the direction of the side face 22c of the second mounting section 22. The side faces 21c, 22c are arranged parallel to each other and bound the sensing section 30 of the carrier unit 20. Whereas the mounting sections 21, 22 serve to attach the load detecting device 18 to the rear axle 15, the sensing section 30 deforms under the strain occurring in the rear axle 15, and it serves for attachment of a plurality of strain gages 35.

The sensing section 30 comprises a first connecting element 31 and a second connecting element 32 which are deformed when the rear axle 15 is subjected to strain. The sensing section 30 further comprises a connecting bar 33 which lends rigidity to the sensing section 30 and serves to protect the connecting elements 31, 32 from a mechanical overload. The connecting elements 31, 32 are each attached at a first end 31a, 32a to the side face 21c of the first mounting section 21. More specifically, the first end 31a of the first connecting element 31 is attached to a lateral edge of the side face 21c of the first mounting block 21 extending parallel to the mounting axis 21a, while the first end 32a of the second connecting element 32 is attached to a further lateral edge of side face 21c, which edge also extends parallel to the mounting bore 21a. As such, the distance between the first ends 31a, 32a corresponds to the width of the side face 21c in a direction perpendicular to the longitudinal axis 19.

The connecting elements 31, 32 extend substantially perpendicular from the side face 21c of the first mounting section 21, i.e. substantially parallel to the longitudinal axis 19, in the direction of the second mounting section 22. The connecting elements 31, 32 have a similar and substantially constant rectangular cross section along the longitudinal axis 19, wherein the rectangular cross sections each comprise two long sides oriented parallel to the mounting axes 21a, 22a and two shorter sides oriented perpendicular to the mounting axes 21a, 22a as well as perpendicular to the longitudinal axis 19. As such, the connecting elements 31, 32 may also be referred to as connecting beams. Furthermore, the connecting elements 31, 32 each have a concave side 31c, 32c and a convex side 31d, 32d, wherein the convex sides 31d, 32d are arranged to face each other. The connecting elements 31, 32 are connected at a second end 31b, 32b to opposing lateral edges of the side face 22c of the second mounting section 22.

The connecting bar 33 extends along the longitudinal axis 19 between the convex side 31d of the first connecting element 31 and the convex side 32d of the second connecting element 32. The connecting bar 33 also extends from a position located on the side face 21c of the first mounting section 21 substantially perpendicular to a position on the side face 22c of the second mounting section 22. A cross section of the connecting bar 33 in a plane perpendicular to the longitudinal axis 19 also comprises a rectangle; however the two shorter sides of the rectangular cross section are arranged parallel to the mounting axes 21a, 22b while the two longer sides are arranged perpendicular to the mounting axes 21a, 22b. In other words, the cross section of the connecting bar 33 is turned 90° to the left or right in comparison to the cross sections of the connecting elements 31, 32. The area of the cross section of the connecting bar 33 is also smaller than the area of the cross section of each of the connecting elements 31, 32.

When the rear axle 15 is subjected to a strain, the corresponding deformation of the rear axle 15 causes the mounting sections 21, 22 to move towards each other or away from each other along the longitudinal axis 19. Such a relative movement between the mounting sections 21, 22 causes the concave sides 31d, 32d of the connecting elements 31, 32 to move towards or away from each other in a direction perpendicular to the longitudinal axis 19. This movement of the connecting elements 31, 32 is referred to as bending, and the resulting displacement of each connecting element 31, 32 in the direction perpendicular to the longitudinal axis 19 (i.e. the extent of such a bending) is referred to as deflection. In this connection, the smaller cross-sectional area of the connecting bar 33 in comparison to the cross-sectional areas of the connecting elements 31, 32 does not impair the bending and deflection of the connecting elements 31, 32.

The connecting elements 31, 32 each carry a pair of strain gages 35 at their concave side 31c, 32c and a pair of strain gages 35 at their convex side 31d, 32d though in FIG. 3 only two of the pairs of strain gages are discernible. In the specific embodiment according to FIG. 3, the strain gages 35 of each pair are oriented in a direction parallel to the longitudinal axis 19; that is a deflection of the connecting elements 31, 32 also causes the strain gages 35 to bend in said direction perpendicular to the longitudinal axis 19. Such a bending deformation of the strain gages 35 causes a change in the electrical resistance of each of the strain gages 35 in a ratio to the deformation of the strain gage 35. This change in the electrical resistance can be measured to determine the deformation of the connecting elements 31, 32 and thus to determine the strain in the rear axle 15.

In order to ensure a precise relationship between the deformation of the strain gages 35 and the change in resistance of the strain gages 35, the strain gages 35 are carried at a position on the connecting elements 31, 32 at which the deflection is greatest, namely at a center point on the connecting elements 31, 32 which is equidistant to the side face 21*c* of mounting section 21 and side face 22*c* of mounting section 22.

As a particular advantage of the embodiment shown in FIG. 3 the strain gages 35 arranged at the concave side 31*c*, 32*c* of the respective connecting element 31, 32 are deformed in a direction opposite to the strain gages 35 arranged at the convex side 31*d*, 32*d* of the respective connecting element 31, 32. This corresponds to a mechanical amplification effect since the resulting electrical signals have opposite signs. Furthermore, since a total of four strain gages 35 are provided at each connecting element 31, 32 these four strain gages 35 may be connected to form a Wheatstone bridge in a full-bridge configuration which results in a particularly high sensitivity of the load detecting device 18. The two Wheatstone bridges (one at each connecting element 31, 32) are independent from one another and as such they can be considered redundant. This may be used for a fail-safe arrangement (one Wheatstone bridge may fail without disabling the load detecting device 18) and/or for increasing the accuracy of the load detecting device 18 (by forming a mean value of the output signals of the two Wheatstone bridges).

Figure 4:
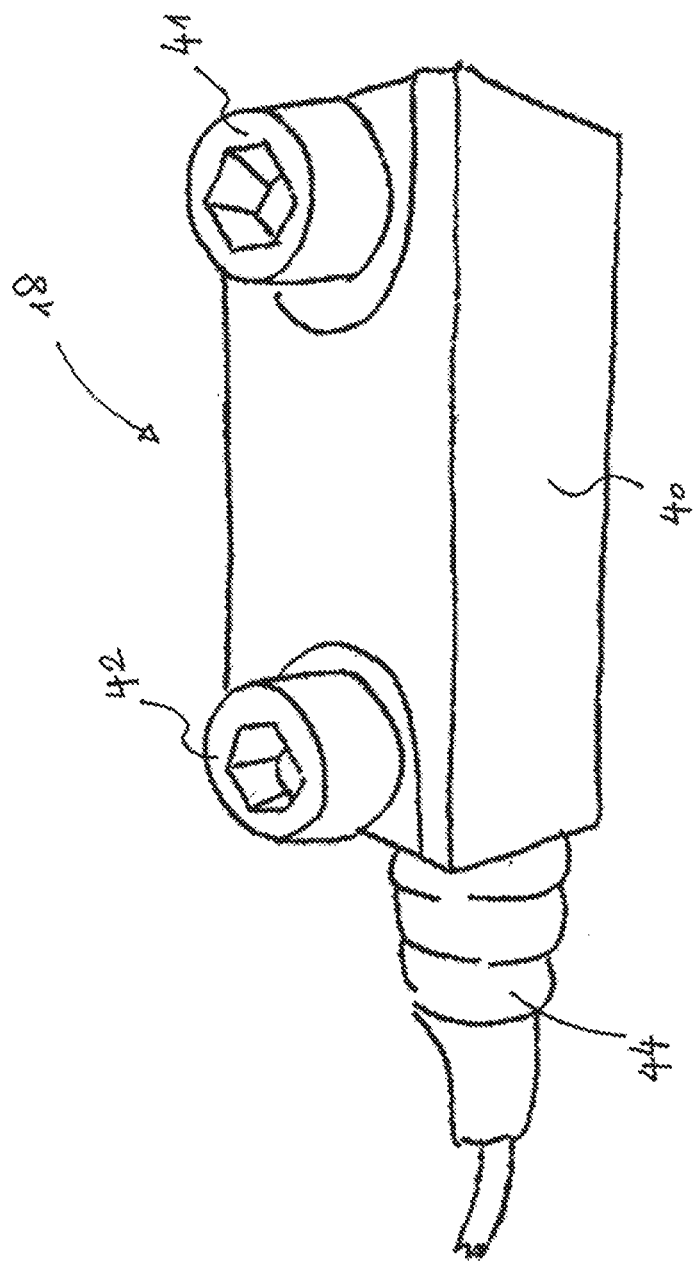
FIG. 4 A perspective view of a further embodiment of the invention comprising a cover.

FIG. 4 shows an enlarged perspective view of the load detecting device 18 as it is mounted in FIG. 2. The load detecting device 18 comprises a cover 40 to protect the carrier unit 20 and the strain gages 35 from environmental influences. The load detecting device 18 further comprises two bolts 41, 42 to mount the load detecting device 18 to the rear axle 15 via the mounting bores 21*b*, 22*b* of the mounting sections 21, 22 (see FIG. 3). FIG. 4 also illustrates a portion of the cabling 44 connecting the load detecting device 18 to the control system of the crane 10, which control system and crane 10 are not shown in the FIG. 4 for reasons of clarity.

LIST OF REFERENCE NUMERALS

10 crane
11 load
12 lever arm
13 front axle
14 boom
15 rear axle
16 rear tire
17 rear tire
18 load detecting device
19 longitudinal axis
20 carrier unit
21 first mounting section
21*a* mounting axis
21*b* mounting bore
21*c* side face
22 second mounting section
22*a* mounting axis
22*b* mounting bore
22*c* side face
30 sensing section
31 first connecting element
31*a* first end
32*b* second end
31*c* concave side
32*d* convex side
32 second connecting element
32*a* first end
32*b* second end
32*c* concave side
32*d* convex side
33 connecting bar
35 pair of strain gages
40 cover
41 first mounting bolt
42 second mounting bolt
40 cable
E direction of boom extension
F force
L pivotal lowering direction
W weight

What is claimed is:

1. A load detecting device for attachment to a structure under load, comprising a carrier unit and a plurality of strain gauges, wherein the carrier unit comprises a first and a second mounting section arranged along a longitudinal axis and connected by a sensing section, wherein the plurality of strain gauges are arranged at the sensing section of the carrier unit, and wherein the sensing section includes two connecting elements extending along the longitudinal axis between the first mounting section and the second mounting section, each of the connecting elements being curved and having a convex side, the convex sides of the two connecting elements facing each other.

2. A load detecting device according to claim 1, wherein the connecting elements have an at least substantially constant cross section.

3. A load detecting device according to claim 1, wherein each of the connecting elements has the same cross section.

4. A load detecting device according to claim 1, wherein each of the connecting elements has a flat rectangular cross section defined by a long dimension and a short dimension, the long dimension of the cross section of one of the two connecting elements being oriented in the same direction as the long dimension of the cross section of the other of the two connecting elements.

5. A load detecting device according to claim 1, wherein the strain gauges carried at the connecting elements are arranged equidistant from the first and the second mounting sections.

6. A load detecting device according to claim 1, wherein the strain gauges are each oriented to be deformed in a direction extending parallel to the longitudinal axis of the carrier unit.

7. A load detecting device according to claim 1, wherein each of the connecting elements has a concave side opposite to the convex side, each of the connecting elements carrying at least one strain gauge at the convex side and at least one strain gauge at the concave side.

8. A load detecting device according to claim 1, wherein each of the connecting elements has a concave side opposite to the convex side, each of the connecting elements carrying a first pair of strain gauges at the convex side and a second pair of strain gauges at the concave side.

9. A load detecting device according to claim 8, wherein the strain gauges of the first pair and the strain gauges of the second pair of each connecting element are connected to form a Wheatstone bridge.

10. A load detecting device according to claim 1, wherein the first mounting section of the carrier unit comprises a mounting bore extending along a first mounting axis, wherein the second mounting section of the carrier unit comprises a mounting bore extending along a second mounting axis, in which the first mounting axis and the second mounting axis extend parallel to each other and perpendicular to the longitudinal axis of the carrier unit.

11. A load detecting device according to claim 10, wherein the connecting elements of the sensing section extend substantially parallel to a plane defined by the first mounting axis and the second mounting axis.

12. A load detecting device according to claim 10, wherein each of the connecting elements has a flat rectangular cross section defined by a long dimension and a short dimension, the long dimension of the cross section of each of the connecting elements being oriented parallel to the first mounting axis and the second mounting axis.

13. A load detecting device according to claim 1, wherein each of the connecting elements has a first end connected to the first mounting section of the carrier unit and a second end connected to the second mounting section of the carrier unit, wherein the distance between the first ends of the connecting elements in a direction perpendicular to the longitudinal axis corresponds to a total width of the first mounting section in said direction, and wherein the distance between the second ends of the connecting elements in said direction perpendicular to the longitudinal axis corresponds to a total width of the second mounting section in said direction.

14. A load detecting device according to claim 13, wherein each of the first mounting section and the second mounting section of the carrier unit comprises a cuboid block, wherein the first ends of the connecting elements are connected to opposing lateral edges of a side face of the cuboid block forming the first mounting section, and wherein the second ends of the connecting elements are connected to opposing lateral edges of a side face of the cuboid block forming the second mounting section.

15. A load detecting device according to claim 1, wherein the mounting sections of the carrier unit are additionally connected by a straight connecting bar extending along the longitudinal axis of the carrier unit.

16. A load detecting device according to claim 15, wherein the connecting bar has a cross sectional area smaller than the cross sectional area of the connecting elements.

17. A load detecting device according to claim 1, wherein the load detecting device further comprises a cover which covers at least the sensing section of the carrier unit.

18. A load detecting device comprising: a carrier unit having a first and a second mounting section that are arranged along a longitudinal axis and connected by a sensing section and a plurality of strain gauges that are arranged in the sensing section of the carrier unit, wherein the sensing section includes two connecting elements that extend longitudinally between the first and second mounting sections and each of the connecting elements has a convex side that is curved toward the longitudinal axis.

19. The load detecting device of claim 18 further comprising:
a connector bar extending between the first and second mounting sections.

20. The load detecting device of claim 18 further comprising:
a mounting bore in each of the first and second mounting sections that is on a predetermined axis that intersects the longitudinal axis.

\* \* \* \* \*